United States Patent
Sullivan (10) Patent No.: US 8,700,529 B2
(45) Date of Patent: *Apr. 15, 2014

(54) MUTUAL FUND CARD METHOD AND SYSTEM

(75) Inventor: Kevin Sullivan, Wilmington, DE (US)

(73) Assignee: JPMorgan Chase Bank, N.A., New York, NY (US)

( * ) Notice: Subject to any disclaimer, the term of this patent is extended or adjusted under 35 U.S.C. 154(b) by 770 days.

This patent is subject to a terminal disclaimer.

(21) Appl. No.: 11/461,951

(22) Filed: Aug. 2, 2006

(65) Prior Publication Data

US 2007/0005497 A1    Jan. 4, 2007

Related U.S. Application Data

(63) Continuation of application No. 11/184,502, filed on Jul. 15, 2005, which is a continuation of application No. 09/511,362, filed on Feb. 23, 2000, now Pat. No. 6,941,279.

(51) Int. Cl.
*G06Q 30/00*    (2012.01)

(52) U.S. Cl.
USPC .............. 705/41; 235/376; 235/379; 235/380; 235/383; 705/14; 705/14.1; 705/14.13; 705/35; 705/40

(58) Field of Classification Search
USPC ............ 35/705; 705/14, 35–45; 235/379, 380
See application file for complete search history.

(56) References Cited

U.S. PATENT DOCUMENTS

| | | | |
|---|---|---|---|
| 3,634,669 A | 1/1972 | Soumas et al. | |
| 3,946,206 A | 3/1976 | Darjany | |
| 4,047,033 A | 9/1977 | Malmberg et al. | |
| 4,465,206 A | 8/1984 | Sorel et al. | |
| 4,545,838 A | 10/1985 | Minkus et al. | |
| 4,582,985 A | 4/1986 | Lofberg | |
| 4,614,861 A | 9/1986 | Pavlov et al. | |
| 4,634,845 A | 1/1987 | Riley et al. | |
| 4,689,478 A | 8/1987 | Hale et al. | |
| 4,700,055 A | 10/1987 | Kashkashian, Jr. | |
| 4,746,787 A | 5/1988 | Okada et al. | |
| 4,750,119 A | 6/1988 | Robertson et al. | |
| 4,752,676 A | 6/1988 | Leonard et al. | |

(Continued)

FOREIGN PATENT DOCUMENTS

| | | |
|---|---|---|
| CA | 2293321 | 6/1998 |
| EP | 959440 | 11/1999 |

(Continued)

OTHER PUBLICATIONS

5500—FDIC General Counsel's Opinion No. 8—Stored Value Cards, 61 Fed. Reg. 40490, http://www.fdic.gov/regulations/laws/rules/5500-500.html, Aug. 2, 1996.

(Continued)

*Primary Examiner* — Robert Niquette (74) *Attorney, Agent, or Firm* — Goodwin Procter LLP (57) ABSTRACT

A computerized method and system for implementing such method, the method comprising establishing a card payment instrument account for an approved customer and an investment account for the benefit of the approved customer. A rebate is calculated periodically based on credit card usage and the rebate is applied to fund the investment account periodically. The rebate is the only funding of the investment account accomplished through the card payment instrument account.

20 Claims, 4 Drawing Sheets

(56) References Cited

U.S. PATENT DOCUMENTS

| | | |
|---|---|---|
| 4,754,418 A | 6/1988 | Hara |
| 4,766,293 A | 8/1988 | Boston |
| 4,766,539 A | 8/1988 | Fox |
| 4,789,928 A | 12/1988 | Fujisaki |
| 4,822,985 A | 4/1989 | Boggan et al. |
| 4,831,242 A | 5/1989 | Englehardt |
| 4,831,526 A | 5/1989 | Luchs et al. |
| 4,868,376 A | 9/1989 | Lessin et al. |
| 4,870,259 A | 9/1989 | Boggan et al. |
| 4,882,675 A | 11/1989 | Nichtberger et al. |
| 4,897,533 A | 1/1990 | Lyszczarz |
| 4,906,826 A | 3/1990 | Spencer |
| 4,908,521 A | 3/1990 | Boggan et al. |
| 4,923,288 A | 5/1990 | Allen et al. |
| 4,928,001 A | 5/1990 | Masada |
| 4,941,090 A | 7/1990 | McCarthy |
| 4,943,707 A | 7/1990 | Boggan |
| 4,953,085 A | 8/1990 | Atkins |
| 4,954,985 A | 9/1990 | Yamazaki |
| 4,961,142 A | 10/1990 | Elliott et al. |
| 4,968,873 A | 11/1990 | Dethloff et al. |
| 4,975,840 A | 12/1990 | DeTore et al. |
| 4,978,401 A | 12/1990 | Bonomi |
| 4,992,940 A | 2/1991 | Dworkin |
| 5,025,372 A | 6/1991 | Burton et al. |
| 5,049,728 A | 9/1991 | Rovin |
| 5,055,662 A | 10/1991 | Hasegawa |
| 5,080,748 A | 1/1992 | Bonomi |
| 5,095,194 A | 3/1992 | Barbanell |
| 5,117,355 A | 5/1992 | McCarthy |
| 5,146,068 A | 9/1992 | Ugawa et al. |
| 5,175,416 A | 12/1992 | Mansvelt et al. |
| 5,180,901 A | 1/1993 | Hiramatsu |
| 5,192,947 A | 3/1993 | Neustein |
| 5,202,286 A | 4/1993 | Nakatani |
| 5,202,826 A | 4/1993 | McCarthy |
| 5,206,488 A | 4/1993 | Teicher |
| 5,206,803 A | 4/1993 | Vitagliano et al. |
| 5,218,631 A | 6/1993 | Katz |
| 5,247,190 A | 9/1993 | Friend et al. |
| 5,276,311 A | 1/1994 | Hennige |
| 5,287,268 A | 2/1994 | McCarthy |
| 5,287,269 A | 2/1994 | Dorrough et al. |
| 5,297,026 A * | 3/1994 | Hoffman .................. 705/14.18 |
| 5,311,594 A | 5/1994 | Penzias |
| 5,326,959 A | 7/1994 | Perazza |
| 5,326,960 A | 7/1994 | Tannenbaum |
| 5,328,809 A | 7/1994 | Holmes et al. |
| 5,339,239 A | 8/1994 | Manabe et al. |
| 5,349,633 A | 9/1994 | Katz |
| 5,350,906 A | 9/1994 | Brody et al. |
| 5,359,183 A | 10/1994 | Skodlar |
| 5,365,575 A | 11/1994 | Katz |
| 5,383,113 A | 1/1995 | Knight et al. |
| 5,397,881 A | 3/1995 | Mannik |
| 5,399,502 A | 3/1995 | Friend et al. |
| 5,401,827 A | 3/1995 | Holmes et al. |
| RE34,915 E | 4/1995 | Nichtberger et al. |
| 5,424,524 A | 6/1995 | Ruppert et al. |
| 5,450,477 A | 9/1995 | Amarant et al. |
| 5,453,601 A | 9/1995 | Rosen |
| 5,455,407 A | 10/1995 | Rosen |
| 5,459,306 A | 10/1995 | Stein et al. |
| 5,465,206 A | 11/1995 | Hilt et al. |
| 5,466,919 A | 11/1995 | Hovakimian |
| 5,471,669 A | 11/1995 | Lidman |
| 5,477,038 A | 12/1995 | Levine et al. |
| 5,477,040 A | 12/1995 | Lalonde |
| 5,479,494 A | 12/1995 | Clitherow |
| 5,482,139 A | 1/1996 | Rivalto |
| 5,483,444 A | 1/1996 | Malark et al. |
| 5,483,445 A | 1/1996 | Pickering |
| 5,500,514 A | 3/1996 | Veeneman et al. |
| 5,511,114 A | 4/1996 | Stimson et al. |
| 5,512,654 A | 4/1996 | Holmes et al. |
| 5,513,102 A | 4/1996 | Auriemma |
| 5,521,363 A | 5/1996 | Tannenbaum |
| 5,530,232 A | 6/1996 | Taylor |
| 5,530,235 A | 6/1996 | Stefik et al. |
| 5,537,314 A | 7/1996 | Kanter |
| 5,544,086 A | 8/1996 | Davis et al. |
| 5,544,246 A | 8/1996 | Mandelbaum et al. |
| 5,553,120 A | 9/1996 | Katz |
| 5,577,109 A | 11/1996 | Stimson et al. |
| 5,578,808 A | 11/1996 | Taylor |
| 5,581,064 A | 12/1996 | Riley et al. |
| 5,585,787 A | 12/1996 | Wallerstein |
| 5,590,038 A | 12/1996 | Pitroda |
| 5,592,560 A | 1/1997 | Deaton et al. |
| 5,604,542 A | 2/1997 | Dedrick |
| 5,608,785 A | 3/1997 | Kasday |
| 5,612,868 A | 3/1997 | Off |
| 5,621,640 A | 4/1997 | Burke |
| 5,621,787 A | 4/1997 | McKoy et al. |
| 5,621,812 A | 4/1997 | Deaton et al. |
| 5,637,845 A | 6/1997 | Kolls |
| 5,638,457 A | 6/1997 | Deaton et al. |
| 5,642,279 A | 6/1997 | Stone et al. |
| 5,642,485 A | 6/1997 | Deaton et al. |
| 5,644,723 A | 7/1997 | Deaton et al. |
| 5,644,727 A | 7/1997 | Atkins |
| 5,649,114 A | 7/1997 | Deaton et al. |
| 5,649,117 A | 7/1997 | Landry |
| 5,649,118 A | 7/1997 | Carlisle et al. |
| 5,653,914 A | 8/1997 | Holmes et al. |
| 5,659,741 A | 8/1997 | Eberhardt |
| 5,664,110 A | 9/1997 | Green et al. |
| 5,664,157 A | 9/1997 | Takahira et al. |
| 5,665,953 A | 9/1997 | Mazzamuto |
| 5,672,678 A | 9/1997 | Holmes et al. |
| 5,675,607 A | 10/1997 | Alesio et al. |
| 5,675,662 A | 10/1997 | Deaton et al. |
| 5,677,955 A | 10/1997 | Doggett et al. |
| 5,684,291 A | 11/1997 | Taskett |
| 5,687,322 A | 11/1997 | Deaton et al. |
| 5,689,100 A | 11/1997 | Carrithers et al. |
| 5,689,650 A | 11/1997 | McClelland et al. |
| 5,692,132 A | 11/1997 | Hogan |
| 5,696,907 A | 12/1997 | Tom |
| 5,699,528 A | 12/1997 | Hogan |
| 5,703,344 A | 12/1997 | Bezy et al. |
| 5,704,046 A | 12/1997 | Hogan |
| 5,705,798 A | 1/1998 | Tarbox |
| 5,708,422 A | 1/1998 | Blonder et al. |
| 5,710,458 A | 1/1998 | Iwasaki |
| 5,710,886 A | 1/1998 | Christensen et al. |
| 5,710,887 A | 1/1998 | Chelliah |
| 5,710,889 A | 1/1998 | Clark et al. |
| 5,715,399 A | 2/1998 | Bezos |
| 5,717,925 A | 2/1998 | Harper et al. |
| 5,721,768 A | 2/1998 | Stimson et al. |
| 5,721,781 A | 2/1998 | Deo et al. |
| 5,726,884 A | 3/1998 | Sturgeon et al. |
| 5,727,153 A | 3/1998 | Powell |
| 5,728,998 A | 3/1998 | Novis et al. |
| 5,729,693 A | 3/1998 | Holda-Fleck |
| 5,734,154 A | 3/1998 | Jachimowicz et al. |
| 5,734,838 A | 3/1998 | Robinson et al. |
| 5,736,728 A | 4/1998 | Matsubara |
| 5,737,421 A | 4/1998 | Audebert |
| 5,740,549 A | 4/1998 | Reilly et al. |
| 5,742,775 A | 4/1998 | King |
| 5,745,049 A | 4/1998 | Akiyama et al. |
| 5,745,706 A | 4/1998 | Wolfberg et al. |
| 5,749,075 A | 5/1998 | Toader et al. |
| 5,760,381 A | 6/1998 | Stich et al. |
| 5,765,138 A | 6/1998 | Aycock et al. |
| 5,765,141 A | 6/1998 | Spector |
| 5,770,843 A | 6/1998 | Rose et al. |
| 5,770,849 A | 6/1998 | Novis et al. |
| 5,774,870 A | 6/1998 | Storey |
| 5,777,305 A | 7/1998 | Smith et al. |
| 5,777,306 A | 7/1998 | Masuda |
| 5,777,903 A | 7/1998 | Piosenka et al. |

(56) References Cited

U.S. PATENT DOCUMENTS

| | | |
|---|---|---|
| 5,778,067 A | 7/1998 | Jones et al. |
| 5,787,156 A | 7/1998 | Katz |
| 5,787,404 A * | 7/1998 | Fernandez-Holmann ...... 705/35 |
| 5,789,733 A | 8/1998 | Jachimowicz et al. |
| 5,794,207 A | 8/1998 | Walker et al. |
| 5,799,087 A | 8/1998 | Rosen |
| 5,802,176 A | 9/1998 | Audebert |
| 5,805,719 A | 9/1998 | Pare et al. |
| 5,806,042 A | 9/1998 | Kelly et al. |
| 5,806,044 A | 9/1998 | Powell |
| 5,806,045 A | 9/1998 | Biorge |
| 5,807,627 A | 9/1998 | Friend et al. |
| 5,809,478 A | 9/1998 | Greco |
| 5,815,657 A | 9/1998 | Williams et al. |
| 5,815,658 A | 9/1998 | Kuriyama |
| 5,819,234 A | 10/1998 | Slavin et al. |
| 5,819,237 A | 10/1998 | Garman |
| 5,832,457 A | 11/1998 | O'Brien et al. |
| 5,832,488 A | 11/1998 | Eberhardt |
| 5,835,061 A | 11/1998 | Stewart |
| 5,835,576 A | 11/1998 | Katz |
| 5,839,113 A | 11/1998 | Federau et al. |
| 5,845,259 A | 12/1998 | West et al. |
| 5,845,260 A | 12/1998 | Nakano et al. |
| 5,852,811 A | 12/1998 | Atkins |
| 5,852,812 A | 12/1998 | Reeder |
| 5,857,079 A | 1/1999 | Claus et al. |
| 5,857,175 A | 1/1999 | Day |
| 5,857,709 A | 1/1999 | Chock |
| 5,859,419 A | 1/1999 | Wynn |
| 5,864,609 A | 1/1999 | Cross et al. |
| 5,864,828 A | 1/1999 | Atkins |
| 5,864,830 A | 1/1999 | Armetta et al. |
| RE36,116 E | 2/1999 | McCarthy |
| 5,870,718 A | 2/1999 | Spector |
| 5,870,721 A | 2/1999 | Norris |
| 5,875,437 A | 2/1999 | Atkins |
| 5,883,377 A | 3/1999 | Chapin, Jr. |
| 5,883,810 A | 3/1999 | Franklin et al. |
| 5,884,271 A | 3/1999 | Pitroda |
| 5,884,278 A | 3/1999 | Powell |
| 5,884,285 A | 3/1999 | Atkins |
| 5,887,065 A | 3/1999 | Audebert |
| 5,890,138 A | 3/1999 | Godin et al. |
| 5,890,140 A | 3/1999 | Clark et al. |
| H1794 H | 4/1999 | Claus |
| 5,897,620 A | 4/1999 | Walker et al. |
| 5,905,246 A | 5/1999 | Fajkowski |
| 5,911,135 A | 6/1999 | Atkins |
| 5,911,136 A | 6/1999 | Atkins |
| 5,914,472 A | 6/1999 | Foladare et al. |
| 5,920,629 A | 7/1999 | Rosen |
| 5,920,844 A | 7/1999 | Hotta et al. |
| 5,920,847 A | 7/1999 | Kolling et al. |
| 5,923,734 A | 7/1999 | Taskett |
| 5,926,800 A | 7/1999 | Baronowski et al. |
| 5,930,217 A | 7/1999 | Kayanuma |
| 5,931,764 A | 8/1999 | Freeman et al. |
| 5,933,817 A | 8/1999 | Hucal |
| 5,937,068 A | 8/1999 | Audebert |
| 5,940,811 A | 8/1999 | Norris |
| 5,952,641 A | 9/1999 | Korshun |
| 5,953,423 A | 9/1999 | Rosen |
| 5,953,710 A | 9/1999 | Fleming |
| 5,955,961 A | 9/1999 | Wallerstein |
| 5,963,648 A | 10/1999 | Rosen |
| 5,970,479 A | 10/1999 | Shepherd |
| 5,970,480 A | 10/1999 | Kalina |
| 5,974,399 A | 10/1999 | Giuliani et al. |
| RE36,365 E | 11/1999 | Levine et al. |
| 5,984,160 A | 11/1999 | Albrecht |
| 5,984,191 A | 11/1999 | Chapin, Jr. |
| 5,987,434 A | 11/1999 | Libman |
| 5,988,509 A | 11/1999 | Taskett |
| 5,991,413 A | 11/1999 | Arditti et al. |
| 5,991,743 A | 11/1999 | Irving et al. |
| 5,991,748 A | 11/1999 | Taskett |
| 5,991,750 A | 11/1999 | Watson |
| 6,000,608 A | 12/1999 | Dorf |
| 6,000,832 A | 12/1999 | Franklin et al. |
| 6,002,383 A | 12/1999 | Shimada |
| 6,003,762 A | 12/1999 | Hayashida |
| 6,004,681 A | 12/1999 | Epstein et al. |
| 6,006,988 A | 12/1999 | Behrmann et al. |
| 6,009,415 A | 12/1999 | Shurling et al. |
| 6,014,636 A | 1/2000 | Reeder |
| 6,014,638 A | 1/2000 | Burge et al. |
| 6,014,645 A | 1/2000 | Cunningham |
| 6,014,749 A | 1/2000 | Gloor et al. |
| 6,016,482 A | 1/2000 | Molinari et al. |
| 6,016,954 A | 1/2000 | Abe et al. |
| 6,018,718 A * | 1/2000 | Walker et al. ............ 705/14.17 |
| 6,019,284 A | 2/2000 | Freeman et al. |
| 6,026,370 A | 2/2000 | Jermyn |
| 6,029,139 A | 2/2000 | Cunningham et al. |
| 6,029,890 A | 2/2000 | Austin |
| 6,032,136 A | 2/2000 | Brake, Jr. et al. |
| 6,036,099 A | 3/2000 | Leighton |
| 6,038,292 A | 3/2000 | Thomas |
| 6,038,552 A | 3/2000 | Fleischl et al. |
| 6,041,315 A | 3/2000 | Pollin |
| 6,045,042 A | 4/2000 | Ohno |
| 6,047,067 A | 4/2000 | Rosen |
| 6,047,268 A | 4/2000 | Bartoli et al. |
| 6,049,463 A | 4/2000 | O'Malley et al. |
| 6,049,773 A | 4/2000 | McCormack et al. |
| 6,049,782 A | 4/2000 | Gottesman et al. |
| 6,058,378 A | 5/2000 | Clark et al. |
| 6,064,985 A | 5/2000 | Anderson |
| 6,065,675 A | 5/2000 | Teicher |
| 6,068,183 A | 5/2000 | Freeman et al. |
| 6,070,067 A | 5/2000 | Nguyen et al. |
| 6,070,147 A | 5/2000 | Harms et al. |
| 6,070,153 A | 5/2000 | Simpson |
| 6,076,068 A | 6/2000 | DeLapa et al. |
| 6,076,072 A | 6/2000 | Libman |
| 6,078,888 A | 6/2000 | Johnson, Jr. |
| 6,078,891 A | 6/2000 | Riordan et al. |
| 6,088,682 A * | 7/2000 | Burke ............................ 705/17 |
| 6,091,817 A | 7/2000 | Bertina et al. |
| 6,092,056 A | 7/2000 | Tull, Jr. et al. |
| 6,095,412 A | 8/2000 | Bertina et al. |
| 6,095,416 A | 8/2000 | Grant et al. |
| 6,098,053 A | 8/2000 | Slater |
| 6,105,011 A | 8/2000 | Morrison, Jr. |
| 6,105,865 A * | 8/2000 | Hardesty ..................... 235/380 |
| 6,112,191 A * | 8/2000 | Burke ............................ 705/41 |
| 6,115,458 A | 9/2000 | Taskett |
| 6,119,932 A | 9/2000 | Maloney et al. |
| 6,122,623 A | 9/2000 | Garman |
| 6,128,598 A | 10/2000 | Walker et al. |
| 6,128,599 A * | 10/2000 | Walker et al. ............ 705/14.27 |
| 6,129,274 A | 10/2000 | Suzuki |
| 6,131,810 A * | 10/2000 | Weiss et al. .................. 235/379 |
| 6,134,536 A | 10/2000 | Shepherd |
| 6,138,917 A | 10/2000 | Chapin, Jr. |
| 6,145,741 A | 11/2000 | Wisdom et al. |
| 6,148,297 A | 11/2000 | Swor et al. |
| 6,161,096 A | 12/2000 | Bell |
| 6,163,770 A | 12/2000 | Gamble et al. |
| 6,164,533 A * | 12/2000 | Barton ......................... 235/380 |
| 6,167,385 A | 12/2000 | Hartley-Urquhart |
| 6,169,975 B1 | 1/2001 | White et al. |
| 6,173,267 B1 | 1/2001 | Cairns |
| 6,182,048 B1 | 1/2001 | Osborn et al. |
| 6,182,894 B1 | 2/2001 | Hackett et al. |
| 6,186,793 B1 | 2/2001 | Brubaker |
| 6,189,787 B1 | 2/2001 | Dorf |
| 6,195,644 B1 | 2/2001 | Bowie |
| 6,202,053 B1 | 3/2001 | Christiansen et al. |
| RE37,122 E | 4/2001 | Levine et al. |
| 6,227,447 B1 | 5/2001 | Campisano |
| 6,243,688 B1 * | 6/2001 | Kalina ....................... 705/14.18 |
| 6,263,316 B1 | 7/2001 | Khan et al. |

(56) References Cited

U.S. PATENT DOCUMENTS

| | | |
|---|---|---|
| 6,265,977 B1 | 7/2001 | Vega et al. |
| 6,278,981 B1 | 8/2001 | Dembo et al. |
| 6,295,522 B1 | 9/2001 | Boesch |
| 6,298,336 B1 | 10/2001 | Davis et al. |
| 6,308,268 B1 | 10/2001 | Audebert |
| 6,311,170 B1 * | 10/2001 | Embrey ................. 705/40 |
| 6,336,099 B1 | 1/2002 | Barnett et al. |
| 6,341,724 B2 | 1/2002 | Campisano |
| 6,343,743 B1 | 2/2002 | Lamla |
| 6,345,261 B1 * | 2/2002 | Feidelson et al. ........ 705/14.18 |
| 6,345,766 B1 | 2/2002 | Taskett et al. |
| 6,349,291 B1 | 2/2002 | Varma |
| 6,360,954 B1 | 3/2002 | Barnardo |
| 6,366,220 B1 | 4/2002 | Elliott |
| 6,373,969 B1 | 4/2002 | Adler |
| 6,377,669 B1 | 4/2002 | Walker et al. |
| 6,385,591 B1 | 5/2002 | Mankoff |
| 6,386,444 B1 | 5/2002 | Sullivan |
| 6,397,202 B1 | 5/2002 | Higgins et al. |
| 6,402,039 B1 | 6/2002 | Freeman et al. |
| 6,405,182 B1 | 6/2002 | Cuervo |
| 6,422,459 B1 | 7/2002 | Kawan |
| 6,422,462 B1 | 7/2002 | Cohen |
| 6,424,029 B1 | 7/2002 | Giesler |
| 6,429,927 B1 | 8/2002 | Borza |
| 6,434,259 B1 | 8/2002 | Hamid et al. |
| 6,434,534 B1 * | 8/2002 | Walker et al. ........... 705/14.13 |
| 6,446,210 B1 | 9/2002 | Borza |
| 6,450,407 B1 | 9/2002 | Freeman et al. |
| 6,463,039 B1 | 10/2002 | Ricci et al. |
| 6,467,684 B2 | 10/2002 | Fite et al. |
| 6,473,500 B1 | 10/2002 | Risafi et al. |
| 6,484,144 B2 | 11/2002 | Martin et al. |
| 6,484,148 B1 | 11/2002 | Boyd |
| 6,498,861 B1 | 12/2002 | Hamid et al. |
| 6,505,168 B1 | 1/2003 | Rothman et al. |
| 6,560,578 B2 | 5/2003 | Eldering |
| 6,574,603 B1 | 6/2003 | Dickson et al. |
| 6,581,839 B1 | 6/2003 | Lasch et al. |
| 6,601,761 B1 | 8/2003 | Katis |
| 6,609,111 B1 | 8/2003 | Bell |
| RE38,255 E | 9/2003 | Levine et al. |
| 6,615,189 B1 | 9/2003 | Phillips et al. |
| 6,615,190 B1 | 9/2003 | Slater |
| 6,625,582 B2 | 9/2003 | Richman et al. |
| 6,631,849 B2 | 10/2003 | Blossom |
| 6,641,049 B2 | 11/2003 | Luu |
| 6,641,050 B2 | 11/2003 | Kelley et al. |
| 6,675,127 B2 | 1/2004 | LaBlanc et al. |
| 6,687,222 B1 | 2/2004 | Mittal et al. |
| 6,693,544 B1 | 2/2004 | Hebbecker |
| 6,742,704 B2 | 6/2004 | Fitzmaurice et al. |
| 6,745,938 B2 | 6/2004 | Sullivan |
| 6,802,008 B1 | 10/2004 | Ikefuji et al. |
| 6,805,287 B2 | 10/2004 | Bishop |
| 6,865,547 B1 | 3/2005 | Brake, Jr. et al. |
| 6,868,426 B1 | 3/2005 | Mankoff |
| 6,876,971 B1 * | 4/2005 | Burke ................... 705/14.1 |
| 7,173,370 B2 | 4/2005 | Burke |
| 6,901,372 B1 | 5/2005 | Helzerman |
| 6,941,279 B1 * | 9/2005 | Sullivan ................. 705/35 |
| 6,985,873 B2 * | 1/2006 | Sullivan ................. 705/14.25 |
| 7,006,992 B1 | 2/2006 | Packwood |
| 7,072,851 B1 * | 7/2006 | Wilcox et al. ............ 705/14.34 |
| 7,086,586 B1 * | 8/2006 | Sullivan .................. 235/379 |
| 7,146,328 B1 * | 12/2006 | Solomon et al. .......... 705/14.34 |
| 7,360,693 B1 * | 4/2008 | Sullivan .................. 235/380 |
| 7,392,224 B1 * | 6/2008 | Bauer et al. ............. 705/41 |
| 7,502,758 B2 | 3/2009 | Burke |
| 8,464,943 B2 * | 6/2013 | Bennett et al. ........... 235/383 |
| 8,505,812 B2 * | 8/2013 | Bennett et al. ........... 235/376 |
| 2001/0011243 A1 | 8/2001 | Dembo et al. |
| 2001/0027441 A1 | 10/2001 | Wankmueller |
| 2001/0034682 A1 | 10/2001 | Knight et al. |
| 2001/0037315 A1 | 11/2001 | Saliba et al. |
| 2001/0044293 A1 | 11/2001 | Morgan |
| 2001/0047342 A1 | 11/2001 | Cuervo |
| 2001/0054003 A1 | 12/2001 | Chien et al. |
| 2001/0056398 A1 | 12/2001 | Scheirer |
| 2002/0019803 A1 | 2/2002 | Muller |
| 2002/0026418 A1 | 2/2002 | Koppel et al. |
| 2002/0046255 A1 | 4/2002 | Moore et al. |
| 2002/0062235 A1 | 5/2002 | Wahlbin et al. |
| 2002/0077978 A1 | 6/2002 | O'Leary et al. |
| 2002/0091572 A1 | 7/2002 | Anderson et al. |
| 2002/0091631 A1 | 7/2002 | Usui |
| 2002/0095365 A1 | 7/2002 | Slavin et al. |
| 2002/0104878 A1 | 8/2002 | Seifert et al. |
| 2002/0116271 A1 | 8/2002 | Mankoff |
| 2002/0116330 A1 | 8/2002 | Hed et al. |
| 2002/0120627 A1 | 8/2002 | Mankoff |
| 2002/0120642 A1 | 8/2002 | Fetherston |
| 2002/0143703 A1 | 10/2002 | Razvan et al. |
| 2002/0147662 A1 | 10/2002 | Anderson |
| 2002/0165820 A1 | 11/2002 | Anvekar et al. |
| 2002/0174016 A1 | 11/2002 | Cuervo |
| 2003/0004828 A1 | 1/2003 | Epstein |
| 2003/0023549 A1 | 1/2003 | Armes et al. |
| 2003/0028518 A1 | 2/2003 | Mankoff |
| 2003/0033211 A1 | 2/2003 | Haines et al. |
| 2003/0033246 A1 | 2/2003 | Slater |
| 2003/0046249 A1 | 3/2003 | Wu |
| 2003/0053609 A1 | 3/2003 | Risafi et al. |
| 2003/0101119 A1 | 5/2003 | Parsons et al. |
| 2003/0105672 A1 | 6/2003 | Epstein et al. |
| 2003/0135462 A1 | 7/2003 | Brake, Jr. et al. |
| 2003/0140004 A1 | 7/2003 | O'Leary et al. |
| 2003/0144935 A1 | 7/2003 | Sobek |
| 2003/0154125 A1 | 8/2003 | Mittal et al. |
| 2003/0163403 A1 | 8/2003 | Chen et al. |
| 2003/0163416 A1 | 8/2003 | Kitajima |
| 2003/0172040 A1 | 9/2003 | Kemper et al. |
| 2003/0195808 A1 | 10/2003 | Brown et al. |
| 2003/0200143 A9 | 10/2003 | Walker et al. |
| 2003/0200180 A1 | 10/2003 | Phelan et al. |
| 2003/0216965 A1 | 11/2003 | Libman |
| 2004/0024672 A1 | 2/2004 | Brake, Jr. et al. |
| 2004/0030626 A1 | 2/2004 | Libman |
| 2004/0039588 A1 | 2/2004 | Libman |
| 2004/0098351 A1 | 5/2004 | Duke |
| 2004/0193539 A1 * | 9/2004 | Sullivan ................. 705/39 |
| 2004/0215505 A1 * | 10/2004 | Sullivan ................. 705/14 |
| 2004/0243498 A1 | 12/2004 | Duke |
| 2005/0021400 A1 | 1/2005 | Postrel |
| 2005/0027649 A1 | 2/2005 | Cech |
| 2005/0071230 A1 | 3/2005 | Mankoff |
| 2005/0075932 A1 | 4/2005 | Mankoff |
| 2005/0091138 A1 | 4/2005 | Awatsu |
| 2005/0171898 A1 | 8/2005 | Bishop et al. |
| 2005/0251470 A1 * | 11/2005 | Sullivan ................. 705/35 |
| 2006/0047589 A1 | 3/2006 | Grau |
| 2006/0111980 A1 * | 5/2006 | Sullivan ................. 705/14 |
| 2006/0206402 A1 * | 9/2006 | Sullivan ................. 705/35 |
| 2006/0206420 A1 | 9/2006 | Burke |
| 2007/0061252 A1 | 3/2007 | Burke |
| 2007/0112629 A1 * | 5/2007 | Solomon et al. .......... 705/14 |
| 2009/0150284 A1 | 6/2009 | Burke |
| 2009/0177564 A1 | 7/2009 | Burke |

FOREIGN PATENT DOCUMENTS

| | | | |
|---|---|---|---|
| GB | 2275654 A | 9/1994 | |
| GB | 2376787 | 12/2002 | |
| GB | 2377071 | 12/2002 | |
| GB | 2377314 | 1/2003 | |
| WO | WO 91/09370 * | 6/1991 | ............ G06F 15/30 |
| WO | WO 94/29112 | 12/1994 | |
| WO | WO 97/41673 | 11/1997 | |
| WO | WO 9859307 | 12/1998 | |
| WO | WO 99/05633 | 2/1999 | |
| WO | WO 01/69347 | 9/2001 | |
| WO | WO 01/69347 A2 | 9/2001 | |
| WO | WO 01/69347 A3 | 9/2001 | |
| WO | WO 2005/043277 A3 | 5/2005 | |

(56) References Cited

FOREIGN PATENT DOCUMENTS

OTHER PUBLICATIONS

Song, A Card That Asks for ID, Time Magazine, Apr. 12, 2004, 1 page.
A Store Card Issuer Looks for Lift from Electronic Gift Certificates, Credit Card News, Feb. 1, 1995, 2 pages.
Hotchkiss, ATM's at the head of their class, Bank Marketing, vol. 29, No. 3, Mar. 1997, pp. 26-32.
Edwards, ATMs The Hot New Media Buy, ABA Banking Journal, Mar. 1999, pp. 58, 60.
Fickenscher, Amex Prepaid Offering is Latest Card for Firms Regarding Employees, American Banker, vol. 161, No. 151, Aug. 8, 1996, pp. 1-2.
Neumann, An Enhanced Neural Network Technique for Software Risk Analysis, IEEE Transactions on Software Engineering, vol. 28, No. 9, Sep. 1, 2002, pp. 904-912.
Associates First Capital Corporation, Hoover's Inc., The Industry Standard: The Newsmagazine of the Internet Economy, thestandard.net/companies/company-display, Apr. 6, 1999.
Award Card Comparison, JA8343.
Brehl, Banks issue cash-card pledge, The Toronto Star, Oct. 9, 1997, 1 page.
Blockbuster running test of a stored value card, The American Banker, Sep. 1, 1995.
Meece, Boatman's Prepaid Cards for Worker-Incentive Firm, American Banker, Jul. 2, 1996, p. 12.
Boatmen's Floats Stored Value into the Employee Incentive Waters, Debit Card News, vol. 2, Issue 2, Jul. 16, 1996, 3 pages.
CES/NaBANCO introduces stored value card technology blockbuster video is first merchant partner, Business Wire, Inc., Jan. 15, 1996.
CardEx Incentives, www.cardex.com, Apr. 6, 1999.
CardFlash, Apr. 5, 2005.
Vandenengel, Cards on the Internet: Advertising on a $3 Bill, Industry Intelligence, Feb. 1, 1995, pp. 46-48.
Kutler, Cash Card Creator Looking Beyond Mondex, Feb. 9, 1995.
Rosen, Cash Just Isn't Flexible Enough: Shops of the Future Will Only Take Cards, Daily Express, Technology Section, Feb. 10, 1995, 1 page.
Bank, Cash, Check,Charge—What's Next?, Seattle Times, Mar. 6, 1995.
Morgan et al., Categorizing Risks for Risk Ranking, vol. 20, No. 1, Jun. 22, 2005. pp. 49-58.
Common electronic purse specifications, Business Requirements, Version 6.0, Dec. 1998.
Guidotti, Comparing Environmental risks: A Consultative Approach to Setting Priorities at the Community Level, Public Health Rev 1994, vol. 22, Jun. 16, 2005, pp. 321-337.
Britt, Competing in Auto Lending, America's Community Banker, vol. 5, No. 11, Nov. 1, 1996, pp. 33-37.
Consortium created to manage common electronic purse specification, Cardtech Securtech, Chicago, www.visa.com/av/news/PRmisc051199.vhtml, May 11, 1999.
Mobasher et al., Creating Adaptive Web Sites Through Usage-Based Clustering of URLs, Knowledge and Data Engineering Exchange Workshop, Chicago, IL and Los Alamitos, CA, 1999, pp. 19-25.
Lamond, Credit Card Transactions Real World and Online, Paying by Credit Card—Real World and Online, http://www.virtualschool.edu/mon/ElectronicProperty/klamond/credit, printed Jul. 8, 2005, 17 pages.
D.C. Area Safeway Stores Look for Increase in Sales Volume and Revenue with Cards, Card News, vol. 6, No. 25, Dec. 30, 1991, pp. 7-9.
Piskora, Debit Cards Seen Poised for New Markets, American Banker, Credit/Debit/ATMs, Mar. 7, 1995, p. 16.
E-Z Pass, Web page, http://www.ezpass.com-Disc_portNewYork.html, Nov. 12, 2001.
E-Z Pass, Web page, http:\\www.ezpass.com-Disc_ny_annual.html, Nov. 12, 2001.
E-Z Pass, Web page, http:\\www.ezpass.com-frameMain.html, Nov. 12, 2001.
E-Z Pass, Web page, http:\\www.ezpass.com-whatis.html, Nov. 12, 2001.
Business Times, Electronic Purse Can Free You from ATM Drag, Business Times, www.btimes.co.za, printed Feb. 23, 2001, 1 page.
Electronic Purse, SCIA (Smart Card Industry Association), About Smart Cards, www.scia.org, printed Feb. 23, 2001, 1 page.
Sanchez-Klein, Electronic purse alliance planned, Computerworld Online News, Jul. 29, 1998, printed Feb. 23, 2001, 2 pages.
Electronic purse card to be launched tomorrow, New Straits Times, News Clippings, Sep. 18, 1999, printed Feb. 23, 2001, 3 pages.
First Data markets stored-value cards, Cards International, Jan. 30, 1996, p. 5.
First USA—Activate Today and Get One Hour Free Calling Card Calls, Call 1-800-555-2535, First USA, 6 pages.
First USA—Call 1(800)335-2453 to Receive One Free Hour of Domestic Long Distance Calling (No Strings Attached). First USA, 6 pages.
First USA Platinum Connect, First USA Bank, First USA Promotional Mailing, Oct. 1997, 6 pages.
First Union Issues Smart Cards to Fort Benning Recruits, CardFax, vol. 1999, No. 60, Mar. 26, 1999, 1 page.
Norris, First data unit develops blockbuster cash card, Omaha World Hearld Sunrise Edition, Business Section, Jan. 19, 1996, p. 16.
Frequently asked questions, ECARD, www.eregard.com, printed Sep. 23, 2001, 7 pages.
Machlis, Have it the smart way: Burger King program drives smartcard use, Computerworld, printed Feb. 23, 2001, 1 page.
Here's the calling convenience you asked for: 1-800-call-ATT . . . For All Calls, AT&T, Appendix A: For Card Carriers, 1999, 7 pages.
Hoovers, General Mills, Inc. Corporate Profile relied upon to show the history of the company, http:/cobrands.hoovers.com/global/cobrands/proquest/history.xhtml?COID=10639, Jul. 12, 2005, 2 pages.
How Is It Different?, JA8331.
Konrad, IBM Had a Bunch of Unusual Ideas in 2003, www.philly.com, printed Jan. 21, 2004, posted on Jan. 13, 2004, 2 pages.
Hansell, Visa to unveil electronic purse cards, New York Times, printed Feb. 23, 2001, 2 pages.
Incentive Firms Find Debit Cards a Rewarding Experience (Off-line debit card issuers converge efforts with companies looking for effective incentives to boost employee productivity and to motivate individuals to buy their products), Debit Card News, vol.
Coulton, Incentives Field Moving to Card-Based Series 14, American Banker, Mar. 26, 1998, 3 pages.
Introducing SpendingMoney(TM), Armetta: Marketing & Design Product Concept Report, Oct. 9, 1996, 15 pages.
Introducing the First USA Platinum Connect Card, First USA Promotional Mailing, Dec. 1997, 2 pages.
Key Bank Holiday Offer, http://www.key.com/swiftgift/home.html, printed Apr. 5, 1999.
MailFrontier Survey Finds that Consumers Hold Financial Institutions Accountable for Online Identitiy Theft, www.mailfrontier.com, Palo Alto, CA, Nov. 2004.
O'Conner, Maritz Gets MasterCard's Stamp of Approval, Business Travel News, Aug. 19, 1996, 2 pages.
Meridian Award Cards, JA8251.
Swiftgift, Welcome to Swiftgift, www.swiftgiftcard.com, Dec. 8, 1998, 10 pages.
Machlis et al., Will smart cards replace ATMS?, Computerworld, printed Feb. 23, 2001, 3 pages.
Meridian—the leader in card marketing, JA8343.
Clark, Microsoft, Visa to Jointly Develop PC Electronic-Shopping Software, The Wall Street Journal, Nov. 9, 1994, WSJ B9.
More Retailers Turn to Co-Branding, Chain Store Age Executive with Shopping Center Age, Feb. 1, 1995, 3 pages.
Bogle, Mutual Funds at the Millennium: Fund Directors and Fund Myths, The Vanguard Group to the '40 Act Institute of PLI (Practicing Law Institute), New York, NY, May 15, 2000, 15 pages.
New 1-800-Call-ATT Campaign Promotes One Number for All Calls, AT&T Marketing, News Release, www.att.com/press/0297/970217.csa.htm, Feb. 17, 1997, 2 pages.

(56) References Cited

OTHER PUBLICATIONS

Schwab, Charles, Now 7 Ways for a better Total Return for Your Money; Schwat 1, The Inventor's Asset Management Account, Charles R. Schwab, Charles Schwab & Co.. Inc., 16 pages.

Dugas, Payroll May Ask: Paper or Plastic?, USA Today, 3B, Aug. 14, 2001, 1 page.

Proton world and Europay to co-operate in creation of new CEPS-compliant e-purse application, Press Release 1999. Waterloo, Belgium, Jun. 28, 1999, 2 pages.

Brown et al., Purchasing Card Magic: Eli Lilly Finds Accounts Payable Flying High With Plastic, Corporate Cashflow, vol. 15, No. 12, Nov. 1994, 2 pages.

Purse Application for Cross Border Use in Euro, Cordis, Pace 1st 1999-11531 Pace, www.cordis.lu, printed Feb. 23, 2001, 3 pages.

SK100 Smart Card Electronic Purse Balance Reader, SK100 Balance Reader, http://perso.wanadoo.fr, printed Feb. 23, 2001, 1 page.

Miller, Section E.2.1: Kerberos Authentication and Authorization System, Project Athena, Cambridge, MA, Dec. 21, 1987, 39 pages.

Souccar, Smart Cards: 1st Union Smart Card Pilot Enlists a Second Army Base, American Banker, Digital Frontiers, vol. 164, No. 61, Mar. 31, 1999, 3 pages.

Smart Cards: Big Brother's Little Helpers, The Privacy Committee of New South Wales, No. 66, Aug. 1995.

Smart card for loyalty and e-purse applications eclipses capability of conventional mag-stripe cards, Press Release, www.1.sib.com, Apr. 21, 1997, printed Feb. 23, 2001, 3 pages.

SmartAxis: Load Cash on to your E-Purse Card. Supported Currencies and Schemes, www.smartaxis.co.uk, printed Feb. 23, 2001, 9 pages.

Spurgin, Sopininmon! or What's Happening in the Retail Credit Card Environment, Credit World Journal, vol. 85, No. 4, Mar. 1, 1997, pp. 20-23.

Lacker, Stored Value Cards: Costly Private Substitutions for Government Currency, Economic Quarterly, 1996, Economic Quarterly, v82, n3, p1(25), ISSN: 1069-7225, 17 pages.

Lazarony, Stuck for a gift? Give a prepaid credit card, www.bankrate.com, Dec. 21, 1998, 1 page.

Key, Swift Gift 'Wows' Internet Shoppers, PR Newswire, www.key.com/swiftgift/home.html, Dec. 2, 1998, 1 page.

The Campus Card Conundrum, Card Technology, Journal ISSN: 1093-1279, p. 25+, Feb. 1998, pp. 1-8.

The Electronic Purse Reaches the Car Park, http:\\docs.vircom.net/mobility/parking, printed Feb. 23, 2001, 2 pages.

The Evolution of a New Consumerism, Chain Store Age, vol. 73, Jun. 1997, pp. 8-9.

Stoughton, The Gift of Credit, www.washingtonpost.com/wp-srv/business, Dec. 14, 1998.

Stuber, The electronic purse: An overview of recent development and issues, Bank of Canada, Technical Report No. 74, www.bankofcanada.ca, Jan. 1996, printed Feb. 23, 2001, 2 pages.

Understanding the benefits: Smartcity offers a number of important benefits to both the card issuers and their customers, http://www.icl.com/smartcards/benefits.htm, printed Feb. 27, 2001, 2 pages.

Langheinrich et al., Unintrusive Customization Techniques for Web Advertising, Computer Networks, vol. 31, 1999, pp. 1259-1272.

Universal Card free lifetime membership extended 3 months, AT&T Marketing, www.att.com/press/0297/970217.csa.html, Dec. 4, 1990, 2 pages.

Visa Cash—Where can I get it?, www.visa-asia.com/pd/cash/where.html, Feb. 23, 2001.

Visa Cash, www.visa-asia.com/pd/cash/main.html, Feb. 23, 2001.

Visa International and SERMEPA Announce Plans for Cross Border Visa Cash Based on CEPS, www.visa.com/av/news/praaamisc111699.vhtml, Nov. 16, 1999.

Visa first to launch electronic purse load via GSM mobile phone, www.cellular.co.za, Johannesburg, ZA, printed Feb. 23, 2001, 4 pages.

Visa releases visa cash electronic purse specifications based on CEPS, www.visa.com/av/news/PRaamisc042099.vhtml, San Francisco, Apr. 20, 1999.

Welcome to Card Express CardEx, CardEx website archived by web.archive on Oct. 31, 1996, http://web.archive.org/web/*/http://www.cardex.com, retrieve Oct. 18, 2003, 7 pages.

Welcome to Card Express, The CardEx Incentive Card, as disclosed in the CardEx web site archived by web.archive.org on Feb. 7, 1998, http://web.archive.org/web/*/http://www.cardex.com, retrieve Oct. 18, 2003, 8 pages.

U.S. Appl. No. 11/433,317, filed May 12, 2006, Kevin Sullivan.

\* cited by examiner

CREDIT STATEMENT BILL FOR ACCOUNT 12345678                    300

| DATE | TRANSACTION CODE | VENDER ID | AMOUNT |
|---|---|---|---|
| X | XXX | A | $XX.XX |
| . | . | . | . |
| . | . | . | . |
| . | . | . | . |
| X | XXX | X | $XX.XX |
| PREVIOUS BALANCE | NEW CHANGES | PAYMENTS | NEW BALANCE |
| $XXXX.XX | $XXX.XX | $XXX.XX | $XXXX.XX |

| CREDIT USAGE FOR MONTH | USAGE REBATE FOR MONTH | CURRENT REBATE VALUE | REBATE PAYOUT DATE | MUTUAL FUND ACCOUNT |
|---|---|---|---|---|
| $XXXX.XX | $XX.XX | $YYY.YYY MUTUAL FUND ACCOUNT | X/X/XX | XXX XXX |

FIG. 3

MUTUAL FUND ACCOUNT STATEMENT XXX XXX               400

| FUND NUMBER | NUMBER OF SHARES | PRESENT VALUE | CREDITS* | FUTURE CREDITS | FUTURE CREDITS PAYOUT DATE |
|---|---|---|---|---|---|
| XXX XXX | $XXX.XX | $XXX.XX | $YYY.YY | $YYY.YY | X/X/XX |

*CREDITS
$YYY.YY TRANSFERRED FROM CARD ISSUER X AS USAGE REBATE
FOR ACCOUNT 12345678 AS OF X/X/XX

MUTUAL FUND CARD METHOD AND SYSTEM

CROSS REFERENCE TO RELATED APPLICATIONS

This application is a continuation under 35 U.S.C. §120 of U.S. Utility application Ser. No. 11/184,502 filed Jul. 15, 2005, entitled "Mutual Fund Card Method and System," which was a continuation of U.S. Utility application Ser. No. 09/511,362, filed Feb. 23, 2000 now U.S. Pat. No. 6,941,279, entitled "Mutual Fund Card Method and System," the entire disclosures of which are hereby incorporated by reference.

This application is also related to the application filed on Jan. 16, 2004, of the same title, assigned application Ser. No. 10/758,262, which was filed as a divisional of application Ser. No. 09/511,362. This application is also related to the application filed on May 12, 2006, assigned application Ser. No. 11/433,317, which was filed as a continuation of divisional of application Ser. No. 09/511,362.

FIELD OF THE INVENTION

The present invention relates generally to a method and system for a card payment instrument that is associated with an investment account. A holder of the card payment instrument can receive rebates based on the usage of the card. The rebates are transferred periodically to an investment account that is established for the benefit of the cardholder.

BACKGROUND OF THE INVENTION

It is increasingly common that consumers pay for many of their products and services using credit cards, charge cards, debit cards, bankcards, stored value cards and like card payment instruments rather than using cash or checks. Consumers do this because they find it more convenient than sending or using cash or checks. Also, consumers are not constrained by cash at hand. For instance, credit cards present unique advantages insofar as they provide a revolving line of credit that can be accessed when personal funds are low. Consumers are inclined to use credit cards versus other means for purchases because itemized reports of transactions (citing amounts and merchant names) are generated each month. This is useful for monitoring spending habits, detecting fraud or errors, disputing charges, proving, purchase when returning items without a conventional receipt, and providing expense records for end-of-year tax purposes.

In fact, in today's so-called "plastic economy" it is increasingly common that consumers use the credit card as a first, rather than last, resort. Many consumers use credit cards for most non-trivial transactions, taking advantage of the typical 20-25 day interest-free grace period and paying their balances off each month, sometimes thousands of dollars. At the other end of the spectrum, many consumers who have expenses that exceed their monthly income on a regular basis use the available revolving credit-line to manage their spending flow. In sum, there is a large body of credit or other cardholders in modern society who engage in a significant volume of transactions on a regular, continuous basis.

The modern plastic economy greatly benefits merchants and service providers because the convenience and instant credit access lead to increased sales. They also benefit the issuer of the credit cards and other card payment instruments such as an issuing bank because for each transaction an "interchange" fee (typically 1-4%) administered by the credit card associations such as Visa® and MasterCard® is distributed to the issuer. The interchange fee is typically deducted from the overall transaction amount. Moreover, the issuer of the credit card benefits from the elevated interest payments made by consumers carrying a balance. Therefore, in the card issuer/merchant/customer model of a card payment instrument system such as a credit card system, the card issuers and merchants receive substantial benefits.

Thus, consumers tend to use their conventional credit cards for certain types of purchases, such as retail transactions in shopping malls, groceries at foodstores, dinner at restaurants, airline tickets and so forth. The credit card's attributes make it well-suited for use in such transactions and the average consumer is likely to reach for his/her credit card rather than for cash in such circumstances due to convenience. However, despite the wide use of credit cards in the modern economy, there is still a need to increase their use especially in non-traditional credit card transactions and financial services.

Some card issuers have sought to employ rebates in order to increase use of credit cards. Credit card rebate systems, such as the Discover® card or the like, provide a rebate tied to general card usage. The entire benefit is enjoyed by consumers who receive a check or credit on their account. However, such credit card rebate systems provide no particular long-term benefits to the cardholder or the card issuer—especially benefits that relate to the card issuer's business. There is limited loyalty-building to encourage cardholders to maintain their existing accounts or open new ones. Moreover, because the rebate is sent directly to the consumer, who can spend it as he/she pleases, there is no mechanism to encourage the consumer to consider other financial products offered by the card issuer or associated financial companies. Nor is there a way to channel funds back to the card issuer to expand business and cross-sell. This is a lost opportunity and significant disadvantage.

Others have suggested credit card systems that transfer a predetermined amount of money to an investment account periodically and bill the cardholder through the credit card account. For example, U.S. Pat. No. 5,787,404 to Fernandez-Holmann describes such a credit card system in combination with a rebate that is also transferred to the investment account. Such credit card systems, however, are not favored by cardholders because they require forced investments on a periodic basis. In addition, many brokerages and securities firms do not offer card acceptance for investment purchases.

SUMMARY OF THE INVENTION

The present invention overcomes one or more of the aforementioned limitations of existing card payment systems and methods. Accordingly, the present invention is directed to a system and method for a card payment instrument with a rebate based on the usage of the card payment instrument. The rebate can only be applied for funding an investment account established for the benefit of the cardholder. Thus, the present invention encourages increased usage of the card payment instrument and the establishment of new investment accounts.

It is an object of the invention to provide a card payment instrument whereby a predetermined percentage of consumer card payment instrument spending is rebated so as to encourage customer use of the card payment instrument and increase loyalty to the card payment instrument issuer.

It is another object of the invention to provide an automatic method for establishing an investment account which relieves the consumer of the burden of having to proactively establish an investment account, and promotes new account openings for the investment account provider.

It is yet another object of the invention to provide a card payment instrument where the card payment instrument issuer and the investment account provider can share the cost of the rebate program so that a significant rebate can be provided without imposing excessive costs on the card payment instrument issuer.

To achieve these and other objects, which will become readily apparent to a person skilled in this art from the following discussion, the present invention, in its broadest aspects, is directed to a computerized method and system for implementing such method, the method comprising establishing a card payment instrument account for an approved customer and all investment account for the benefit of the approved customer. A rebate is calculated periodically based on credit card usage and the rebate is applied to fund the investment account periodically. The rebate is the only funding of the investment account accomplished through the card payment instrument account. Preferably, the card payment instrument is issued by the card payment instrument issuer in partnership with the investment account provider. The investment account provider is preferably a financial institution such as a bank, savings and loan association, mutual fund, insurance company, brokerage, credit union or any other entity authorized by law to accept deposits from, or sell investments, mutual funds or annuities to, the general public.

In one embodiment of the present invention the card payment instrument is a credit card and the investment account is a mutual fund account provided by an investment account provider. Preferably, the consumer signs up for the card knowing about the ability to earn dollars that fund a mutual fund. The rebate is preferably calculated as a percentage of the value of the net-purchases by the customer using the credit card. The rebate is calculated periodically, such as on a monthly or quarterly basis and a statement is issued to the cardholder which includes an entry for an estimated rebate for the current period as well as the total accumulated rebate. The statement may further include an offer to the cardholder to activate and fund an investment account which is established automatically for his/her benefit by the investment account provider if this option wasn't taken by the consumer at the outset. Upon acceptance of the offer by the cardholder, the mutual fund account is automatically activated and funded with the accumulated purchase rebates. The mutual fund account is funded with the purchase rebates on a monthly basis, preferably once or twice a year, more preferably on a semi-annual basis and even more preferably on a yearly basis. The rebate amount is preferably transferred to the investment account electronically, however, other ways of transferring could be used including, for instance, submitting the rebate as a two-party check which can be submitted by the consumer to the investment account provider. An investment account statement is issued to the customer preferably by the investment account provider on a periodic basis. The investment account provider is preferably an independent entity from the card payment instrument issuer and the cost or funding of the rebate program is shared by both entities. The customer may independently fund the investment account at any time.

This method and system which is also referred to hereinafter as the mutual fund card ("MFC") is advantageous in a number of respects. First it encourages the creation of new investment accounts and maintenance of existing credit card accounts. Second, it provides investment account companies such as brokerage companies all entry into the credit card economy. It is beneficial to associated investment account providers such as mutual fund issuers who seek expanded opportunities to create a loyalty and retention platform for new or existing customers. Moreover, the funding of the investment account with the purchase rebates serves as a powerful incentive to customers to stay loyal to the credit card issuer, increase the usage of their credit cards and open new investment accounts or maintain existing ones with associated financial institutions. Thus, the MFC system and method opens the door for unique partnership relationships between independent business entities, not otherwise readily established between financial institutions such as for example banks and brokerage companies.

The accompanying drawings further illustrate the present invention. They illustrate several specific embodiments of the invention and, together with the description, serve to explain the principles of the invention. However, it will become apparent from the drawings and description that other embodiments, objects, advantages and benefits of the invention also exist. Thus, it should be understood that the drawings and the specific embodiments are given for purposes of illustrating the invention and are not intended to limit the scope of the invention which is delineated in the appended claims.

Additional features and advantages of the invention will be set forth in the description that follows, and in part will be apparent from the description, or may be learned by practice of the invention. The objectives and other advantages of the invention will be realized and attained by the system and methods, particularly pointed out in the written description and claims hereof as well as the appended drawings.

BRIEF DESCRIPTION OF THE DRAWINGS

The purpose and advantages of the present invention will be apparent to those of skill in the art from the following detailed description in conjunction with the appended drawings in which like reference characters are used to indicate like elements, and in which.

DETAILED DESCRIPTION OF THE INVENTION

The present invention is directed to a method and apparatus for a card payment instrument with a rebate that is associated with an investment account, whereby rebates based on card usage are transferred to the investment account periodically for funding the investment account. The term "card payment instrument" is used herein to mean credit cards, multi-featured credit cards, debit cards, bank cards, stored value cards, transaction cards and like instruments. According to one embodiment of the invention a credit card is issued by a credit card issuer such as a bank in partnership with an investment account provider such as a brokerage company. Preferably, the brokerage company offers shares in a mutual fund investment program. A credit issuer such as a bank issues approved customers a credit card having a line of credit and a predetermined annual percentage rate (APR). The card is preferably marked with information of the identity of the issuing bank as well as the investment account provider. When the card is issued, the bank notifies the partner investment account provider to open a mutual fund account for the benefit of the cardholder. Net purchases made with the credit card are tracked and at the end of predetermined periods, a fixed, predetermined percentage, preferably from about 0.5 to about 2.0 and more preferably from about 0.75 to about 1.25 percent of the total value of the net purchases is rebated by the bank into the mutual fund account. During special marketing promotional periods, the rebate account can be increased. The cost of the rebate program is preferably absorbed by both the credit card issuer and the investment account provider which allows for greater rebates to the consumer. In the normal course of business, the partner investment account provider may issue the customer a mutual fund or investment account statement. Alternatively, a combined credit card account and mutual fund account statement may be issued, preferably by the credit card issuer. In addition, the customer may purchase additional mutual fund shares at any time.

Overview of the Invention According to One Embodiment

Figure 1:
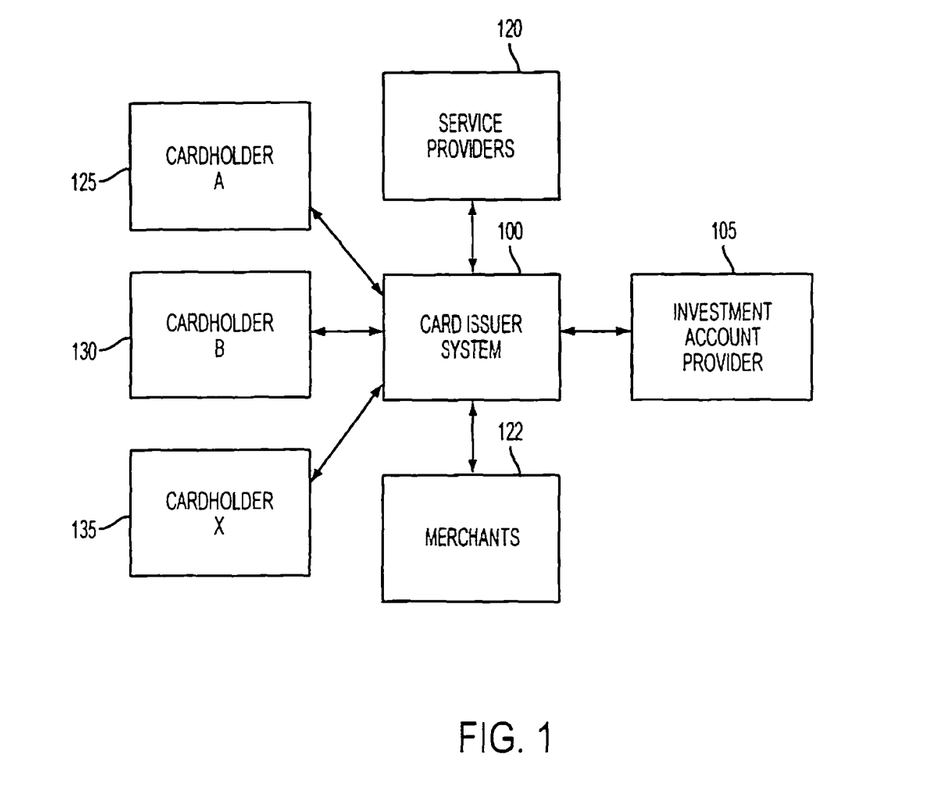
FIG. 1 is a block diagram illustrating the relationship between cardholders, service providers, merchants, the card issuer system and investment account provider, according to an embodiment of the present invention.

FIG. 1 provides an overview of the relationships between the various components according to one embodiment of the present invention, and may comprise cardholder A 125, cardholder B 130, cardholder X 135; card issuer system 100; service providers 120 and merchants 122; and investment account provider 105. Card issuer system 100 may comprise a server-based system carrying out the operations of the card issuer, such as for receiving applications, maintaining account data, processing transactions, and interfacing with cardholders, merchants, service providers and investment account providers.

Service providers 120 and merchants 122 illustrate the various vendors that interact with cardholders A-X (blocks 125-135) and card issuer 100 during transactions involving the purchase of goods and services.

Investment account provider 105 represents an investment account provider participating as the partner in the mutual fund card program associated with the present invention. Investment account provider 105 may comprise personnel and/or computer means for receiving and processing usage rebate funds or "points" submitted by card issuer system 100 or from individual cardholders, such as cardholders A-X (blocks 125-135). In one embodiment, the invention provides for investment account provider 105 to receive and process checks or wire transfers from card issuer system 100 so that the card usage rebate for a given time period is sent from the card issuer to the investment account provider to be credited against the benefiting investment account. Preferably the investment account is a mutual fund account. In a related embodiment, the invention provides for investment account provider 105 to process electronic transfers (such as automated clearing house drafts) from card issuer system 100 for each approved cardholder that are processed in an automated or semi-automated fashion to credit the proper investment account with the proper card usage rebates. In another embodiment, the invention provides for investment account provider 105 to receive and process two-party checks, initially issued to cardholders from card issuer system 100, that are forwarded by the cardholders to the investment account provider for depositing into the respective cardholder investment accounts. These checks would be made so that cardholders could only deposit them to their investment accounts, thus providing an incentive to the cardholders to activate and/or maintain the investment accounts.

In the preferred embodiment, investment account provider 105 represents an investment account provider that is partnered with the card issuer issuing a so-called "co-branded" credit instrument. For such co-branded credit or debit cards, the physical card may be issued in the investment account provider's name (and also in the card issuer's name) to take advantage of the benefits of cross-selling and to facilitate loyalty-building. In another embodiment, the credit card with the rebate feature is not marketed as a co-branded offering per se, but cardholders are offered the option to add the investment account feature at any time.

Cardholder A 125, cardholder B 130 and cardholder X 135 represent cardholders maintaining card accounts according to the present invention. In other words, these cardholders maintain a credit or debit card account with the card issuer whereby a predetermined percentage of card usage is accumulated and returned as a rebate to be applied for funding an investment account set-up by the brokerage provider for the benefit of each cardholder. In a preferred embodiment the investment accounts are provided by an investment account provider that is associated with the card-issuer.

In an alternate embodiment, cardholders can maintain investment accounts with investment account providers that are not formally partnered with the card issuer, as described previously. In this case, the card issuer has not entered into a formal arrangement with the investment account provider, but rather is marketing the card to consumers on the basis that purchase rebates will be transferred to an investment account designated by the cardholder. This rebate may also take the form of a two-party check sent to the cardholder for depositing it into the investment account. Or the rebate could be sent directly to the investment account provider (by check, wire transfer, electronic payment, and the like). One of the benefits of this alternate embodiment is that it encourages non-partnered investment account providers to consider a formal partnering relationship (e.g. a co-branded card). This is because an initially non-partnered investment account provider gradually becomes aware of the profit and marketing potential that exist from co-branding and participating in the program. This benefits both the card issuer and investment account provider because processing can be streamlined (e.g. rebates can be transferred electronically and automatically, even in batch fashion, rather than through wire transfers or checks) and cross-marketing and joint loyalty benefits accrue. For example, the card issuer and investment account provider can cross-market whereby customers of the one are solicited to purchase the products or engage the services of the other. A co-branded debit card could serve as a consumer access vehicle to an investment account provider deposit account such as a money market fund. This is a substantial advantage.

Cardholders A-X (blocks 125-135) interface with card issuer system 100 for purposes of payment and receipt of bills and the like using the mail system, Internet or like shared network. Cardholders A-X (blocks 125-135) interface with merchants 122 and service providers 120 to consummate purchases and the like in-person or using the mail system or Internet or like shared network. Cardholders A-X (blocks 125-135) interface with investment account providers 105 for purposes of opening accounts, submission of payments, receipt of bills and the like using the mail system, Internet or like shared network.

As noted above, the present invention may provide a percentage rebate based on card usage that can be paid by the card issuer. In one embodiment, that amount may be fixed at 1% of the value of net-purchases calculated periodically and vested after a standard period, such as a quartet or year. In this embodiment, the balance of the usage rebate will be updated and reported to the cardholder on a periodic basis, such as at the time each monthly card statement is issued. The usage rebate rate can vary, for example, based on the investment account provider's concern (higher or lower rebate rates depending on the investment account provider and the agreement with the card issuer) and based on the cardmember (higher or lower rebate rates based on the cardmember's past or ongoing purchasing behavior, credit rating, levels of spending [e.g., a higher rebate rate at higher levels of spending], loyalty in terms of how long the cardmember has been associated with the card issuer and/or the investment account provider, payment performance, etc.). In one embodiment, the funding for the usage rebate may be shared between the card issuer and an investment account provider as both benefit from the arrangement. In yet another embodiment, the rebate percentage is fixed at a predetermined level provided by the credit card issuer.

Regarding the accrual or computation period, the usage rebate may be computed on a periodic basis, such as on a monthly basis. Since credit card issuers generally deliver paper or on-line statements to cardholders on a monthly basis, it may be convenient and cost-effective to accrue and report the usage rebate in similar fashion. Timing for payout, i.e., when the rebate funds are transferred to the investment account provider for depositing into the investment account, can vary as well. In one embodiment, the payout period may be annually or semi-annually so as to reduce processing costs for the cardholder and investment account provider. It can also enhance cardmember loyalty to both the card issuer and investment account provider if the payout is predicated on the cardmember still being an active account holder. For example, a cardmember contemplating canceling the credit account and/or the investment account program in July may be less inclined to do so if he/she knows that the accumulated rebate that will mature or vest later in September would be lost.

The present invention is not limited to a specific type of investment account. A variety of different types of investment vehicles could be used such as "e brokerage" accounts, money market funds, general stock investment accounts and employee stock purchase accounts. As can be readily appreciated, this means that the present invention provides significant opportunities for financial institutions such as investment account providers to market cardmembers on a broad spectrum of investment products that are available.

The Card Issuer System

Figure 2:
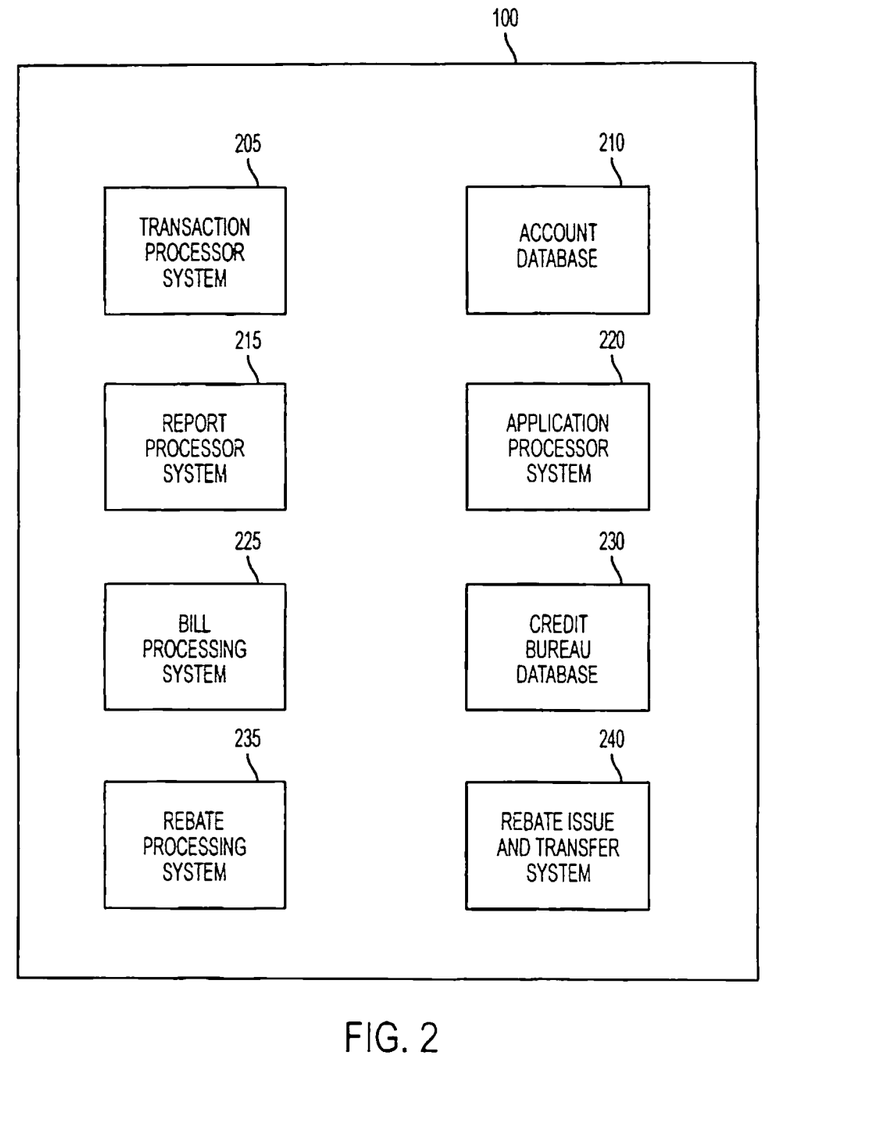
FIG. 2 is a block diagram according to an embodiment of the invention illustrating the components of a card issuer system.

FIG. 2 illustrates card issuer system 100, which may comprise transaction processor system 205; account database 210; report processor system 215; application processor system 220; bill processing system 225; credit bureau database 230; rebate processing system 235; and rebate issue and transfer system 240. Those of skill in the art should appreciate that the allocation of the aforementioned elements is exemplary and functional, the purpose here being to explain the present invention most clearly. The functions performed by said elements could be allocated differently, such that the elements could be combined or further divided depending on the requirements of specific implementation into hardware and/or software. Additionally, the elements of the system need not be co-located, but could reside at geographically distinct locations and could interface using communications technologies well known in the art, such as direct-dial connections, hard-wire link, the Internet or IPng (Internet Protocol next generation), satellite, microwave, cellular networks and so on.

Transaction processor system 205 is a computer-implemented system, which may be a server-based system, for processing transactions in the credit card-based system, such as consummating purchases (issuing transaction codes, declines, call the bank ["call me"] referrals, etc.), processing payments from cardholders, and processing transactions with investment account providers. Account database 210 may comprise one or more data modules having account data for the cardholders, including investment account data and investment account provider data. Report processor system 215 generates reports or statements for the card issuer and/or investment account provider company summarizing cardholder activity, profits and revenue and the like. Application processor system 220 receives and processes applications for credit cards, and may set up accounts when applications are approved. In one embodiment, application processor 220 could also receive applications for investment accounts, and process said requests or forward them to the investment account provider for processing. Bill processing system 225 prepares the bills to be sent to cardholders, including a summary of charges, balance clue, accrued rebate balance, due date and the like. The bills may optionally include investment account information. Credit bureau database 230 may comprise a database accessed for application processing for making the underwriting determination associated with credit card approval and/or investment account approval. Since the present invention is susceptible to application to debit cards, the aforementioned elements could perform the corresponding operations for a debit card instrument.

Rebate processing system 235 performs the processing associated with accounts established for cardholders under the present invention and, accordingly, computes card usage over the proper period, computes the usage rebate, and maintains the usage rebate balance for participating cardholders. Rebate issue and transfer system 240 performs the processing and transactions for issuing and transferring the usage rebates in the appropriate amounts and at the proper times. Thus, rebate issue and transfer system 240 may determine that a six-month rebate for a certain investment account will vest for a particular cardholder on December 15 and transfer said rebate via check, wire transfer, or electronic transfer to the investment account. Data stored in account database 210 may be accessed to inform rebate issue and transfer system 240 whether the form of the transfer should be check, wire or electronic for a particular investment account or investment account company. Rebate issue and transfer system 240 may determine that the usage rebate should be issued to the cardholder in the form of a two-party check. As explained above, the rebate is preferably based on the net purchases in a credit card account.

Exemplary Credit Card and Investment Account Statements for the Invention

Figure 3:
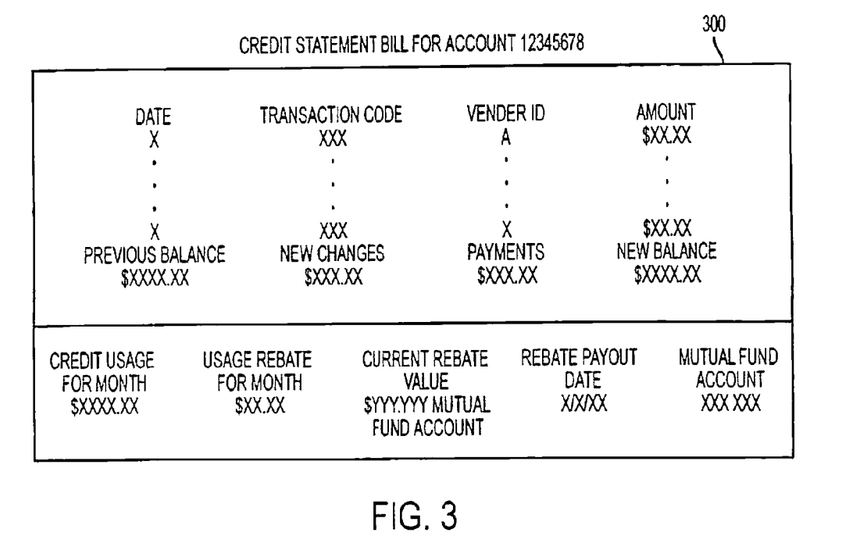
FIG. 3 is a block diagram according to an embodiment of the invention illustrating an exemplary credit card bill issued to a cardholder, including summaries of the rebate balance.

FIG. 3 illustrates an exemplary statement (bill) issued to a cardholder according to the invention. As those of skill in the art will appreciate, the hill could be issued through the mail or via facsimile or Internet or like network interface. As depicted by FIG. 3, the credit card statement resembles a typical credit card statement identifying the date, transaction codes, vendor/merchant ID's and amounts for the transactions from the last period. The previous balance, new charges, payments and new balance are also reported. For purposes of reporting the status of the usage rebate, the card usage for the period (here for the month it is "$XXXX.XX") is reported, as well as the usage rebate for the period as computed based on the rebate rate (e.g. 1% of $XXXX.XX yields a usage rebate for the month in the amount of $XX.XX). The current rebate value or balance is reported (here it is "$YYY.YY"), reflecting the accrued value of the usage rebate that has yet to vest or be paid out. The rebate payout date reflecting when the usage rebate will vest or be made available is reported (here it is "X/X/XX"), as is the identity of the beneficiary account (investment account provider account) to which the rebate may be applied.

Figure 4:
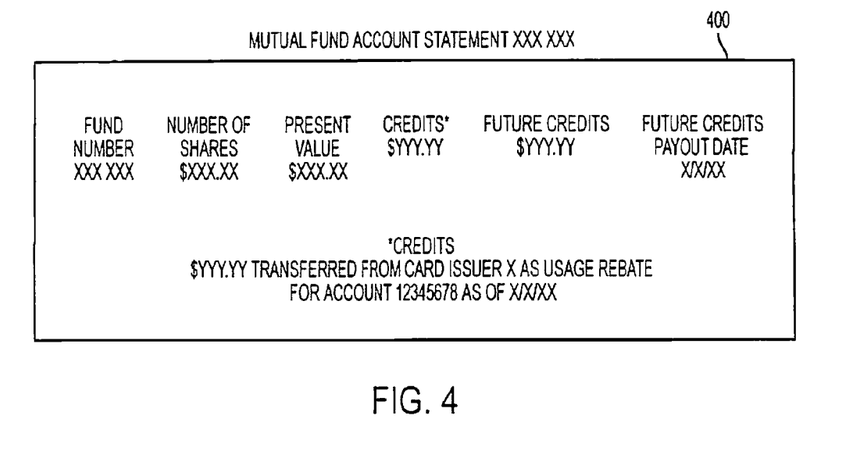
FIG. 4 is a block diagram according to an embodiment of the invention illustrating an exemplary mutual fund account statement, including a summary of credits rebated by a card issuer system.

FIG. 4 illustrates an exemplary investment account provider statement that might be generated by the investment account provider according to the present invention. As would typically be the case, the investment account number, number of shares, and date are listed. Credits received from a card issuer in the form of usage rebates (here it is "$YYY.YY") according to the present invention may be listed as credits, with an explanation identifying the amount and source of the credits (usage rebates). Rebates that have not been transferred to the investment account as of the date of the statement may also be included in the statement as future credits.

It should be noted that the investment account provider statement illustrated by FIG. 4 is more illustrative of the card usage rebate application where rebate funds are sent or transferred from the card issuer to the investment account provider. In the embodiment providing for rebate funds to be sent to the cardholder in the form of a two-party check or the like, the cardholder will forward the rebate check to the investment account provider.

A Method for Providing Card Usage Rebates for Funding a Mutual Fund Account

Figure 5:
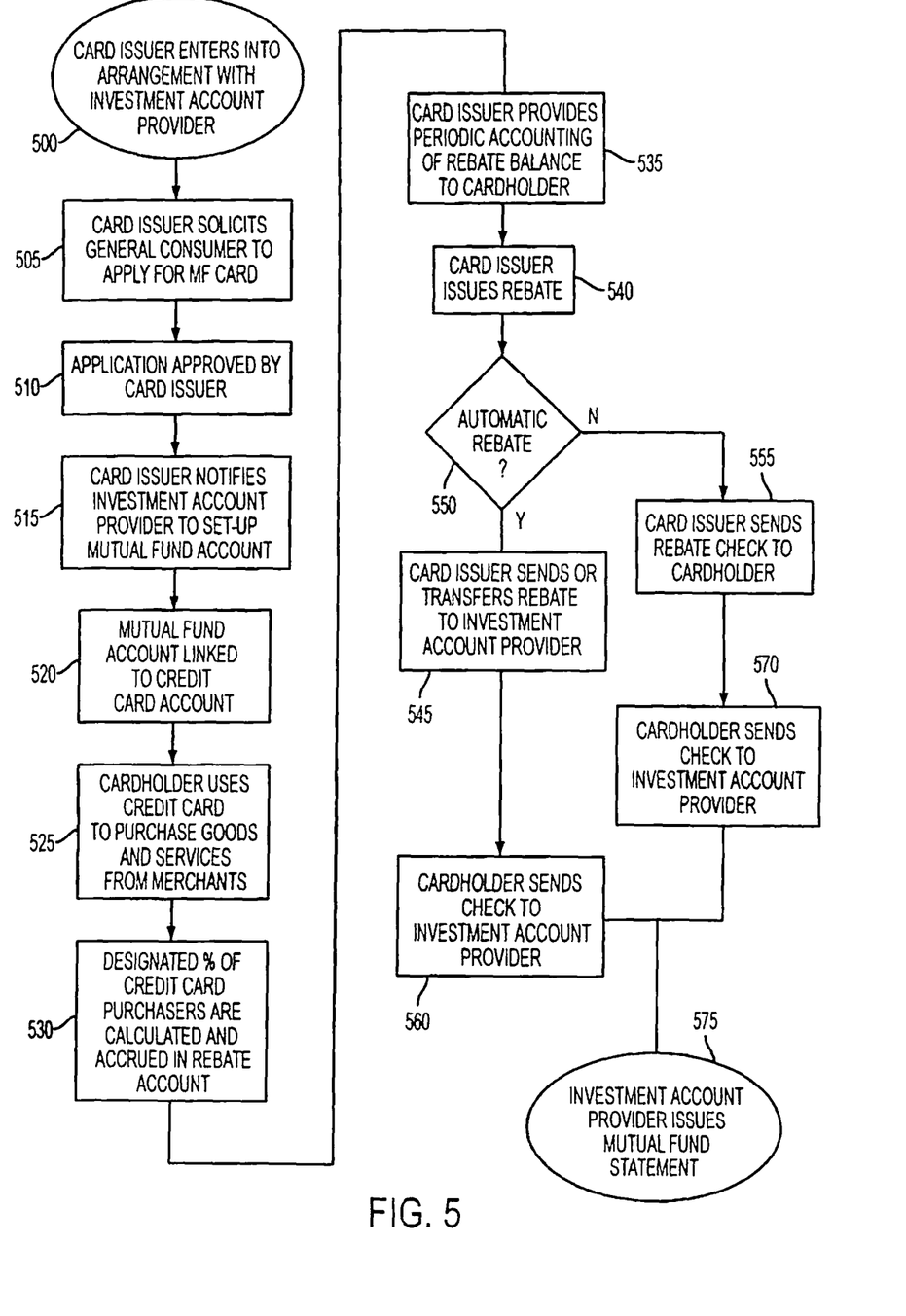
FIG. 5 is a flowchart illustrating a method according to an embodiment of the invention for providing rebates to a cardholder's mutual fund account based on card usage.

According to an embodiment of the present invention, FIG. 5 depicts a method for a credit card system providing card usage rebates to a cardholder for application to a mutual fund account set-up by an investment account provider for the benefit of the cardholder. Where the instrument is a debit card, the steps are substantially the same except the usage is based on a debit instrument.

A card issuer enters into an arrangement with an investment account provider (e.g., see account database 210), according to step 500. As previously noted, this arrangement may be in the form of a partnering or co-branding undertaking whereby the credit or debit cards are issued under the credit issuer's name and the two entities, the credit card issuer and the investment account provider, have pre-established procedures for handling the processing associated with the accrual and application of rebates to a mutual fund account. Alternatively, the investment account provider and card issuer may not have a partnering relationship, or have any pre-existing relationship at all, but step 500 includes the interface and communication between the two entities for the usage rebate program to be implemented for a given cardholder.

According to step 505, the card issuer (or its agent) solicits a general consumer to apply for a mutual fund card. The application is processed and approved by the card issuer (e.g. see application processor system 220, credit bureau database 230), according to step 510. The card issuer notifies the investment account provider to set-up a mutual fund account for the approved cardholder according to step 515. The mutual fund account card is linked or associated with the credit card (or debit) account (e.g., see account database 210), according to step 520. The cardholder uses the credit (or debit) card to purchase goods and services from merchants (or service providers) (e.g., see transaction processor system 205), according to step 525. A designated percentage of credit card purchases is calculated and accrues in the usage rebate account (e.g. see rebate processing system 235 and account database 210), according to step 530.

The card issuer provides a periodic accounting of the usage rebate balance to the cardholder (e.g., see bill processing system 225), according to step 535. The card issuer issues a rebate (see, e.g. module 240. FIG. 2) when the usage rebate "vests" or is due to be paid out, according to step 540. If the rebate is to be a so-called "automatic" payout (sent from the card issuer to the investment account concern), according to the "Y" (yes) branch of block 545, then the card issuer sends or transfers the rebate to the investment account concern to be credited to the proper investment account provider account (e.g. see module 240, FIG. 2), according to step 550. If the rebate is not a so-called "automatic" rebate, according to the "N" (no) branch of block 545, the card issuer sends a check (two-party check or bank draft, or wire or electronic transfer, or the equivalent) to the cardholder (e.g., see module 240, FIG. 2), according to step 555.

According to step 570, the cardholder sends the check or like instrument to the investment account provider. According to step 575, the investment account provider issues a mutual fund statement to the cardholder. The cardholder can make independent deposits to the mutual fund account, according to step 560.

Other embodiments and uses of this invention will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

What is claimed is:

1. A computerized method for transferring funds resulting from use by multiple accountholders of payment instrument accounts provided by a card issuer to investment accounts of the accountholders, each accountholder having both a payment instrument account and a corresponding investment account, the method comprising:

maintaining a database having information of payment instrument accounts of accountholders, each payment instrument account comprising one or more of a credit card account, a debit card account, and a stored value account provided by a card issuer;

maintaining a database having information of at least some investment accounts provided by an investment account provider, wherein the investment account provider is a financial institution and each investment account is funded with funds determined as a result of accountholder use of the corresponding payment instrument account for transactions;

linking, using one or more computer processors, each payment instrument account with a corresponding investment account of each accountholder, the linking establishing a direct payment or fund transfer path between said card issuer and said corresponding investment account of said each accountholder without requiring any intermediary escrow account and without restricting investment activities of said corresponding investment account of said each accountholder;

processing, using a transaction processor system including at least one computer processor, information of accountholder transactions carried out using the payment instrument account and storing the information; and determining, implementing a rewards processing system operated by the card issuer and including at least one computer processor, a funds transfer amount based on the stored information including each accountholder's use of the corresponding payment instrument account to conduct one or more transactions, wherein the funds transfer amount is a reward funded by the card issuer and/or the investment account provider;

determining, with a reward issue and transfer system including at least one computer processor, whether the funds transfer amount is subject to an automatic transfer based on data stored in the payment instrument account database;

if it is determined that the funds transfer amount is subject to an automatic transfer, transferring the determined funds transfer amount from the card issuer automatically and directly to the corresponding investment account of the accountholder; and if it is determined that the funds transfer amount is not subject to an automatic transfer, issuing a payment of the determined funds transfer amount to the corresponding accountholder.

2. The method of claim 1, wherein the funds transfer amount is funded by the accountholder.

3. The method of claim 1, wherein the investment account provider is associated with the card issuer.

4. The method of claim 1, wherein the database having information of the payment instrument account and the database having information of the investment account are collocated in the same database.

5. The method of claim 1, wherein the accountholder transactions are carried out using a transaction card corresponding to the payment instrument account.

6. The method of claim 1, wherein the funds transfer amount is computed based on the transaction amount of the one or more transactions.

7. The method of claim 1, wherein the funds transfer amount is computed for each transaction made by the accountholder.

8. The method of claim 1, wherein the funds transfer amount is computed for a plurality of transactions made by the accountholder.

9. The method of claim 1, wherein the determined funds transfer amounts are transferred to the investment account following each time that a funds transfer amount is determined.

10. The method of claim 1, wherein determined funds transfer amounts are aggregated and transferred to the investment account as an aggregated transaction.

11. The method of claim 1, wherein the transfer is an electronic transfer of funds.

12. The method of claim 1, wherein the investment account is one that is designated by the accountholder.

13. The method of claim 1, wherein the routing of the first funds results from a first transaction on the payment instrument account and the routing of the second funds results from a different transaction other than the first transaction on the payment instrument account.

14. The method of claim 1, wherein the payment of the determined funds transfer amounts issued to the corresponding accountholder can only be deposited into the investment account linked to the accountholder's payment instrument account, such that each accountholder purchase transaction results in first funds being routed to a merchant from whom the accountholder made a purchase, and in second funds being routed directly or indirectly to the corresponding investment account of the accountholder.

15. The method of claim 1, wherein determined funds transfer amounts accumulate as points that are transferred as funds into the investment account.

16. The method of claim 1, wherein determined funds transfer amounts accumulate without being transferred to the investment account until predetermined criteria are met.

17. The method of claim 16, wherein the predetermined criteria comprise a duration of time before accumulated fund amounts can be transferred.

18. An article of manufacture comprising computer readable media with program code for transferring funds resulting from use by multiple accountholders of payment instrument accounts provided by a card issuer to investment accounts of the accountholders, each accountholder having both a payment instrument account and a corresponding investment account, the computer readable with program code causing a computer to implement at least one processor to perform:

maintaining a database having information of payment instrument accounts of accountholders, each payment instrument account comprising one or more of a credit card account, a debit card account, and a stored value account provided by a card issuer;

maintaining a database having information of at least some investment accounts provided by an investment account provider, wherein the investment account provider is a financial institution and each investment account is funded with funds determined as a result of accountholder use of the corresponding payment instrument account for transactions;

linking, using one or more computer processors, each payment instrument account with a corresponding investment account of each accountholder, the linking establishing a direct payment or fund transfer path between said card issuer and said corresponding investment account of said each accountholder without requiring any intermediary escrow account and without restricting investment activities of said corresponding investment account of said each accountholder;

processing information of accountholder transactions carried out using the payment instrument account and storing the information; and determining, implementing a rewards processing system operated by the card issuer, a funds transfer amount based on the stored information including each accountholder's use of the corresponding payment instrument account to conduct one or more transactions, wherein the funds transfer amount is a reward funded by the card issuer and/or the investment account provider;

determining, with a reward issue and transfer system including at least one computer processor, whether the funds transfer amount is subject to an automatic transfer based on data stored in the payment instrument account database;

if it is determined that the funds transfer amount is subject to an automatic transfer, transferring the determined funds transfer amount from the card issuer automatically and directly to the corresponding investment account of the accountholder; and if it is determined that the funds transfer amount is not subject to an automatic transfer, issuing a payment of the determined funds transfer amount to the corresponding accountholder.

19. The article of manufacture of claim 18, wherein the funds transfer amounts are funded by a third party.

20. The article of manufacture of claim 18, wherein the payment of the determined funds transfer amounts issued to the corresponding accountholder can only be deposited into the investment account linked to the accountholder's payment instrument account, such that each accountholder purchase transaction results in first funds being routed to a merchant from whom the accountholder made a purchase, and in second funds being routed directly or indirectly to the corresponding investment account of the accountholder.

* * * * *